US012785429B2

(12) United States Patent
Jeong et al.

(10) Patent No.: US 12,785,429 B2
(45) Date of Patent: Nov. 3, 2026

(54) DEVICE AND METHOD FOR SOC BALANCE CONTROL FOR DELTA STRUCTURE SEMICONDUCTOR TRANSFORMER-BASED ENERGY STORAGE DEVICE

(71) Applicant: HYOSUNG HEAVY INDUSTRIES CORPORATION, Seoul (KR)

(72) Inventors: Byung Hwan Jeong, Gwacheon-si (KR); Hae Won Seo, Seoul (KR); Byeng Jo Byen, Suwon-si (KR); Jae Hyuk Kim, Gwacheon-si (KR); Sung Joo Kim, Goyang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 936 days.

(21) Appl. No.: 18/013,228

(22) PCT Filed: Nov. 16, 2021

(86) PCT No.: PCT/KR2021/095104

§ 371 (c)(1),
(2) Date: Dec. 27, 2022

(87) PCT Pub. No.: WO2022/108429

PCT Pub. Date: May 27, 2022

(65) Prior Publication Data

US 2023/0253810 A1 Aug. 10, 2023

(30) Foreign Application Priority Data

Nov. 18, 2020 (KR) ........................ 10-2020-0155018

(51) Int. Cl.
*H02J 7/00* (2026.01)
*H02J 7/14* (2006.01)
(Continued)

(52) U.S. Cl.
CPC ................ *H02J 7/82* (2026.01); *H02J 7/575* (2026.01); *H02J 7/63* (2026.01)

(58) Field of Classification Search
CPC ................ H02J 7/63; H02J 7/82; H02J 7/575
(Continued)

(56) References Cited

U.S. PATENT DOCUMENTS

| | | | | |
|---|---|---|---|---|
| 10,637,251 | B2 * | 4/2020 | Helling | H02M 7/483 |
| 11,735,930 | B2 * | 8/2023 | Choi | H02J 7/40 320/134 |

(Continued)

FOREIGN PATENT DOCUMENTS

| | | | |
|---|---|---|---|
| CN | 105337297 | A | 2/2016 |
| JP | 2014-233122 | A | 12/2014 |

(Continued)

OTHER PUBLICATIONS

Kim, Jae-Hyuk, et al. Sub-module Battery SOC Balancing Control for BESS Based on MMC with Delta Configuration. The Korean Institute of Power Electronics, Proceedings of the KIPE Conference, p. 97-98, Nov. 24, 2017.

(Continued)

*Primary Examiner* — Alexis B Pacheco
(74) *Attorney, Agent, or Firm* — NKL LAW; Jae Youn Kim

(57) ABSTRACT

Provided are a device and method for SoC balance control for a delta structure semiconductor transformer-based energy storage device, for operating a charging and discharging time of a system by controlling balance of battery SoC of a PCS connected by a delta connection so as to prevent overdischarging and overcharging of a specific battery, controlling a zero-phase-sequence component of the delta connection to balance the battery SoC for each phase, and controlling balance of an individual battery SoC. The
(Continued)

device for SoC balance control for a delta structure semiconductor transformer-based energy storage device of the present invention is composed of an SoC balance control device that controls charging and discharging of a battery such that, in a PCS that performs charging and discharging from three-phase AC power, an A-phase, a B-phase, and a C-phase PCS connected by a delta connection, and the battery SoC of the PCS, are balanced.

7 Claims, 6 Drawing Sheets

(51) Int. Cl.
*H02J 7/50* (2026.01)
*H02J 7/63* (2026.01)
*H02J 7/82* (2026.01)

(58) Field of Classification Search
USPC .......................................................... 320/132
See application file for complete search history.

(56) References Cited

U.S. PATENT DOCUMENTS

2004/0070280 A1* 4/2004 Nakata ...................... H02J 3/32 307/69
2005/0242781 A1* 11/2005 Nakagawa ............. F02C 3/305 320/137
2009/0091295 A1 4/2009 Wan
2010/0244781 A1* 9/2010 Kramer ..................... H02J 7/54 320/162
2012/0069612 A1* 3/2012 Hasler ................... H02J 3/1842 363/71
2012/0081939 A1* 4/2012 Hasler ..................... H02M 7/49 363/126
2016/0109493 A1* 4/2016 Cheng ................... H02J 3/1857 324/76.12
2018/0278064 A1* 9/2018 Kikuchi ............. G01R 31/3842
2019/0199230 A1* 6/2019 Vasiladiotis .......... H02M 5/225
2020/0044452 A1* 2/2020 Soua ......................... H02J 7/54
2020/0127458 A1* 4/2020 Kato ................. H02M 7/53871
2022/0103088 A1* 3/2022 Slepchenkov ........ H02M 7/003
2022/0121260 A1* 4/2022 King ......................... G06F 1/28
2023/0261563 A1* 8/2023 Fujiwara ............... H02M 7/487 363/56.02

FOREIGN PATENT DOCUMENTS

JP 2015-108967 A 6/2015
KR 10-2015-0039957 A 4/2015

OTHER PUBLICATIONS

Vasiladiotis Michail et al., "A Modular Multiport Power Electronic Transformer With Integrated Split Battery Energy Storage for Versatile Ultrafast EV Charging Stations", IEEE Transactions On Industrial Electronics, IEEE Service Center, Piscataway, NJ, USA, vol. 62, No. 5, May 1, 2015.
Diaz-Gonzalez Francisco et al., "A Comparison of Power Conversion Systems for Modular Battery-Based Energy Storage Systems", IEEE Access, IEEE, USA, vol. 8, Feb. 7, 2020.
European Search Report for Application No. 21895196.0, Sep. 27, 2024.
J.J. Jung et al., 'DC Capacitor Voltage Balancing Control for Delta-Connected Cascaded H-Bridge Statcom Considering Unbalanced Grid and Load Conditions', publication Jul. 21, 2017, pp. 4726-4735, IEEE Transactions on Power Electronics , vol. 33, No. 6, Jun. 2018 [retrieved from internet on Sep. 25, 2023].

* cited by examiner

DEVICE AND METHOD FOR SOC BALANCE CONTROL FOR DELTA STRUCTURE SEMICONDUCTOR TRANSFORMER-BASED ENERGY STORAGE DEVICE

TECHNICAL FIELD

The present invention relates to an SoC (State of Charge) equalization control device and method of an energy storage device based on a delta structure semiconductor transformer, and more particularly, to controlling so that a battery SoC inside the energy storage device based on the delta structure semiconductor transformer can be equalized.

BACKGROUND ART

Recently, due to a rapid increase in power demand, generation of a new renewable energy power and development of a battery energy storage system (BESS) are required.

A PCS (Power Conditioning System) for a BESS basically needs to have a function of performing bi-directional power control of a DC power supply and an AC power supply between a power grid and a battery, improving reliability of the power grid and quickly supplying stored energy during peak power demand.

Recently, as the demand for large-capacity BESS increases, development of structures and control algorithms of PCSs for large-capacity BESS is actively progressing. There is a disadvantage that, when SoCs (States of Charge) of batters connected to modules are not equalized, utilization efficiency of the batteries can drop rapidly, and research to overcome this advantage has been continued.

For example, Korean Patent Publication No. 10-2013-0118395 discloses an SoC equalization control method in a battery charging/discharging system of a cascade H-bridge Multi-level structure in which a 21-level output voltage is formed by connecting four H-Bridge modules having a voltage ratio of 1:2:3:4 in series and un-equalized SoCs of the batteries connected to the respective modules are suppressed depending on appropriate selection of a gate pattern, so that an output voltage close to a sine wave is formed by using a small number of the H-Bridge modules, a harmonics of output voltages and currents are reduced through a harmonic reduction algorithm, and a utilization rate of battery is improved by actively suppressing the un-equalized SoCs of the batteries connected to the respective modules.

However, in this case, there is a disadvantage that, while it is possible to control the battery SoC equalization of the PCS connected in the Y connection, it is impossible to control the battery SoC equalization of the PCS connected in the delta connection.

SUMMARY OF INVENTION

Technical Problem

An object of the present invention is to provide an SoC equalization control device and method of an energy storage device based on a delta structure semiconductor transformer that prevents overdischarging and overcharging of a specific battery by performing equalization control for SoCs of batteries of PCSs connected in a delta connection.

In addition, other object of the present invention is to an SoC equalization control device and method of an energy storage device based on a delta structure semiconductor transformer capable of effectively operating a charging time and a discharging time of a system by performing equalization control of each-phase battery SoCs with control of zero phase components of a delta connection and equalizing individual battery SoCs.

Solution to Problem

An SoC equalization control device of the energy storage device based on the delta structure semiconductor transformer according to the present invention may include: an A-phase PCS, a B-phase PCS, and a C-phase PCS in which PCSs (Power Conditioning Systems) performing charging/discharging from a 3-phase AC power supply are connected in a delta connection; and an SoC equalization control device controlling the charging/discharging of a battery so that battery SoCs (State of Charge) of the PCSs are equalized.

Herein, at least two or more PCSs in the A-phase PCS, the B-phase PCS, and the C-phase PCS may connected in series therein.

In addition, the PCS may include: an AC/DC converter converting an alternating current (AC) into a direct current (DC) and storing power in the capacitor; and a DC/DC converter performing DC/DC conversion in order to store the power stored in the capacitor in the battery.

Herein, the SoC equalization control device may include a positive/negative/zero phase component extraction unit extracting powers of the positive, negative, and zero components of the delta connection; an each-phase SoC equalization control unit calculating a total zero phase component AC voltage command value based on an output of the positive/negative/zero phase component extraction unit for the equalization control of the each-phase battery SoC of the A-phase PCS, the B-phase PCS, and the C-phase PCS; an individual SoC equalization control unit calculating an individual capacitor voltage command value for the equalization control of individual battery SoC of the A-phase PCS, the B-phase PCS, and the C-phase PCS; an AC voltage control unit calculating an each-phase AC voltage command value based on outputs of the positive/negative phase/zero phase component extraction unit and the each-phase SoC equalization control unit; a battery voltage control unit calculating an individual battery voltage command value based on an output of the individual SoC equalization control unit; an AC/DC converter control unit controlling the AC/DC converter of the PCS based on outputs of the individual SoC equalization control unit and the AC voltage control unit; and a DC/DC converter control unit controlling the DC/DC converter of the PCS based on an output of the battery voltage control unit.

Also, the positive/negative/zero phase component extraction unit may extract the powers of the positive, negative, and zero phase components based on the each-phase AC voltage and the each-phase AC current.

Herein, the each-phase SoC equalization control unit may include an A-phase zero phase component power command value calculation unit calculating a zero phase component power command value of the A-phase PCS based on a difference between the average battery SoC of the A-phase PCS and the total battery SoC and the average battery voltage of the A-phase PCS; a B-phase zero phase component power command value calculation unit calculating a zero phase component power command value of the B-phase PCS based on a difference between the average battery SoC of the B-phase PCS and the total battery SoC and the average battery voltage of the B-phase PCS; a C-phase zero phase component power command value calculation unit calculating a zero phase component power command value of the C-phase PCS based on a difference between the average battery SoC of the C-phase PCS and the total battery SoC and the average battery voltage of the C-phase PCS; a zero phase component current command value calculation unit calculating a total zero phase component current command value based on outputs of the A-phase zero component power command value calculation unit, the B-phase zero component power command value calculation unit, and the C-phase zero component power command value calculation unit; and a zero phase component voltage command value calculation unit calculating a total zero phase component voltage command value based on a difference between an output of the zero phase component current command value calculation unit and a current total zero phase component current.

In addition, the individual SoC equalization control unit may calculate an individual battery charging/discharging voltage command value based on the difference of the individual SoCs compared to the each-phase average SoC and may calculate the individual capacitor voltage command value based on the individual battery charging/discharging voltage command value and the total capacitor voltage command value that is an average of the individual capacitor voltage command value.

Herein, the battery voltage control unit may calculate the individual battery voltage command value for controlling the DC/DC converter of the PCS based on a difference between the individual capacitor voltage and the individual capacitor voltage command value and the individual battery voltage.

In addition, the AC/DC converter control unit may control the AC/DC converter of the PCS based on the ratio of the individual capacitor voltage command value and the total capacitor voltage command value that is an average of the individual capacitor voltage command value and the each-phase voltage command value.

According to another embodiment of the present invention, the SoC equalization controlling method of the delta structure semiconductor transformer-based energy storage device may include a positive/negative/zero phase component extracting process of extracting powers of positive, negative, and zero phase components of an A-phase PCS, a B-phase PCS, and a C-phase PCS in which PCSs performing charging/discharging from a 3-phase AC power supply are connected in a delta connection; an each-phase SoC equalization control process of calculating a total zero phase component AC voltage command value based on the powers of the positive, negative, and zero phase components for equalization control of each-phase battery SoCs of the A-phase PCS, the B-phase PCS, and the C-phase PCS; an individual SoC equalization controlling process of calculating an individual capacitor voltage command value for equalization control of individual battery SoCs of the A-phase PCS, the B-phase PCS, and the C-phase PCS; an AC voltage controlling process of calculating an each-phase AC voltage command value based on the powers of the positive, negative, and zero phase components and the total zero phase component AC voltage command value; a battery voltage controlling process of calculating an individual battery voltage command value based on an output of the individual capacitor voltage command value; an AC/DC converter controlling process of controlling the AC/DC converter of the PCS based on the individual capacitor voltage command value and the each-phase AC voltage command value; and a DC/DC converter controlling process of controlling the DC/DC converter of the PCS based on the individual battery voltage command value.

Herein, the positive/negative/zero phase component extracting process may be to extract the powers of positive, negative, and zero phase components based on the each-phase AC voltage and the each-phase AC current.

In addition, the each-phase SoC equalization control step may include steps of: calculating a zero phase component power command value of the A-phase PCS based on a difference of average battery SoC of the A-phase PCS compared to a total battery SoC and an average battery voltage of the A-phase PCS by an A-phase zero phase component power command value calculation unit; calculating a zero phase component power command value of the B-phase PCS based on a difference of average battery SoC of the B-phase PCS compared to a total battery SoC and an average battery voltage of the B-phase PCS by an B-phase zero phase component power command value calculation unit; calculating a zero phase component power command value of the C-phase PCS based on a difference of average battery SoC of the C-phase PCS compared to a total battery SoC and an average battery voltage of the C-phase PCS by an C-phase zero phase component power command value calculation unit; calculating a total zero phase component current command value based on outputs of the A-phase zero phase component power command value calculation unit, the B-phase zero phase component power command value calculation unit, and the C-phase zero phase component power command value calculation unit by a zero phase component current command value calculation unit; and calculating a total zero phase component voltage command value based on a difference between an output of the zero phase component current command value calculation unit and a current total zero phase component current by a zero phase component voltage command value calculation unit.

Herein, the individual SoC equalization controlling step may be to calculate an individual battery charging/discharging voltage command value based on the difference of the individual SoC compared to an each-phase average SoC and calculate the individual capacitor voltage command value based on the individual charging/discharging voltage command value and a total capacitor voltage command value that is an average of the individual capacitor voltage command value.

In addition, the battery voltage controlling step may be to calculate the individual battery voltage command value for controlling the DC/DC converter of the PCS based on a difference between the individual capacitor voltage and the individual capacitor voltage command value and the individual battery voltage.

Herein, the AC/DC converter controlling step may be to control the AC/DC converter of the PCS based on a ratio of the individual capacitor voltage command value and the total capacitor voltage command value that is an average of the individual capacitor voltage command value and the each-phase voltage command value.

Advantageous Effects of Invention

The SoC equalization control device and method of the energy storage device based on the delta structure semiconductor transformer according to the present invention has an advantage of preventing overdischarging and overcharging of a specific battery by performing equalization control for SoCs of batteries of PCSs connected in a delta connection.

In addition, the SoC equalization control device and method of the energy storage device based on the delta structure semiconductor transformer according to the present invention has an advantage in that a charging time and a discharging time of a system can be effectively operated by performing equalization control of each-phase battery SoCs with control of zero phase components of a delta connection and equalizing individual battery SoCs.

BRIEF DESCRIPTION OF THE DRAWINGS

FIG. 7A is a waveform diagram illustrating the phase current of the delta connection, and FIG. 7B is a waveform diagram illustrating the supply current of the 3-phase AC power, which is the input of the delta connection.

DESCRIPTION OF EMBODIMENTS

Figure 1:
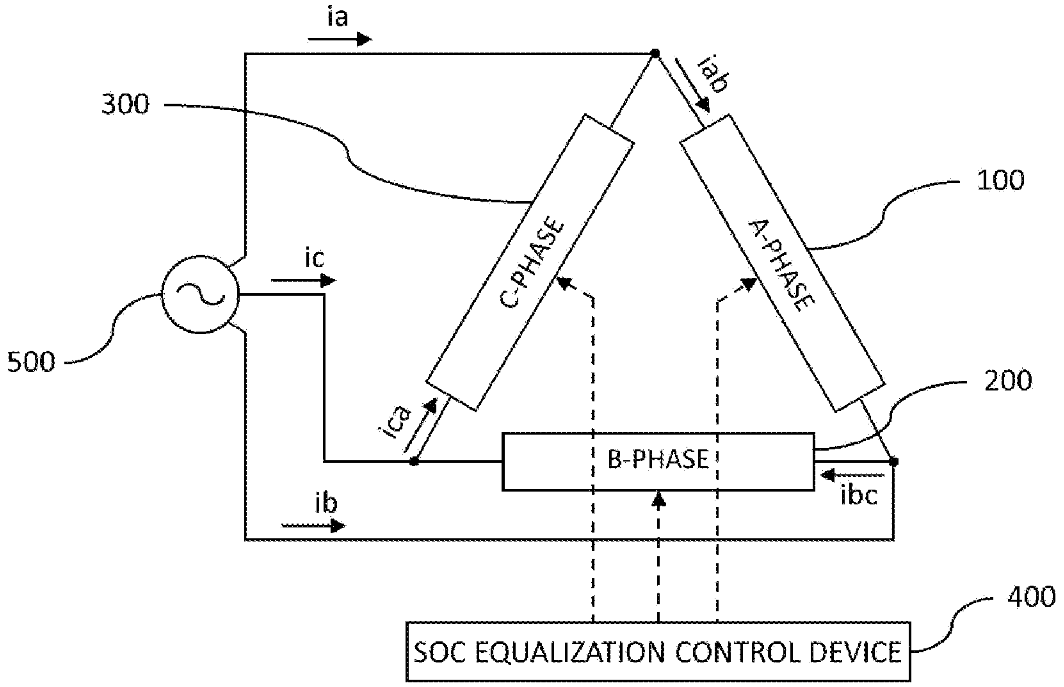
FIG. 1 is a block diagram illustrating the SoC equalization control device of the energy storage device based on the delta structure semiconductor transformer according to the embodiment of the present invention.

Specific embodiments for carrying out the present invention will be described with reference to the accompanying drawings.

The present invention can be variously changed and can have various embodiments, and thus, specific embodiments are illustrated in the drawings and described in detail in the detailed description. This is not intended to limit the present invention to the specific embodiment, and it can be understood to include all modifications, equivalents, and substitutes included within the spirit and scope of the invention.

Hereinafter, the SoC equalization control device and method of the energy storage device based on the delta structure semiconductor transformer according to the present invention will be described in detail with reference to the accompanying drawings.

FIG. 1 is a block diagram illustrating the SoC equalization control device of the energy storage device based on the delta structure semiconductor transformer according to the embodiment of the present invention, and FIGS. 2 to 7 are detailed diagrams illustrating FIG. 1 in detail.

Hereinafter, the SoC equalization control device of the energy storage device based on the delta structure semiconductor transformer according to the embodiment of the present invention will be described with reference to FIGS. 1 to 7.

First, referring to FIG. 1, the SoC equalization control device of the energy storage device based on the delta structure semiconductor transformer according to the embodiment of the present invention includes an A-phase PCS 100, a B-phase PCS 200, and a C-phase PCS 300 in which PCSs (Power Conditioning Systems) performing charging/discharging from a 3-phase AC power supply 500 are connected in a delta connection, and an SoC equalization control device 400 that controls the charging/discharging of the battery so that battery SoCs (State of Charge) of the PCSs are equalized.

Herein, the 3-phase AC power supply 500 represents the power grid to which the distributed power is connected, and SoC equalization control device of the energy storage device based on the delta structure semiconductor transformer can serve as storing the power of this grid in the battery or supply the power stored in the battery to the grid again.

At this time, since the different SoC can be illustrated due to the differences in characteristics between the batteries, there is a disadvantage in that a specific battery deteriorates when the equalization control is not performed.

Therefore, in the present invention, by performing the equalization control on individual battery SoCs in a PCS, overdischarging and overcharging caused by un-equalized battery SoC can be prevented, and the charging time and the discharging time of the system can be effectively managed. In addition, the phenomenon in which the charging time and the discharging time are limited by the specific battery due to un-equalized battery SoC can be prevented.

Figure 2:
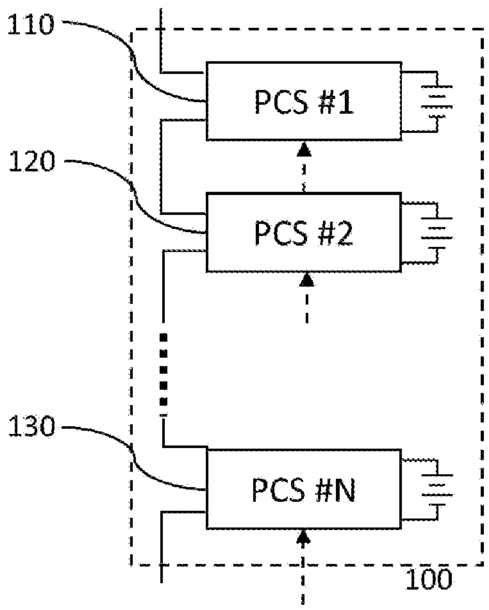
FIG. 2 is a diagram illustrating the A-phase PCS of FIG. 1 in detail.

FIG. 2 is a diagram illustrating the A-phase PCS 100 of FIG. 1 in detail.

As illustrated in FIG. 2, at least two or more PCSs inside the A-phase PCS 100, the B-phase PCS 200, or the C-phase PCS 300 can be connected in series therein.

That is, in order to store the large amount of power, the plurality of PCSs such as the first PCS 110, the second PCS 120, and the N-th PCS 130 can be connected in series. For example, when the 3-phase AC power supply 500 is 6.6 kV and 60 Hz, in order to achieve the system rated capacity of 10 MW, each phase reactor of 5 mH and ten PCSs can be connected in series, and at this time, 1,155 V and 69 Ah can be used for a battery pack per PCS.

Figure 3:
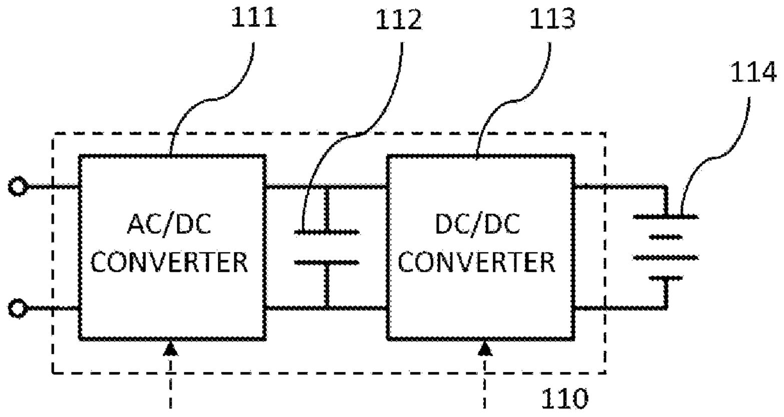
FIG. 3 is a diagram illustrating the first PCS of FIG. 2 in detail.

FIG. 3 is a diagram illustrating the first PCS 110 of FIG. 2 in detail.

As illustrated in FIG. 3, the PCS includes an AC/DC converter 111 that converts an alternating current (AC) into a direct current (DC) and stores the power in the capacitor 112 and a DC/DC converter 113 that performs DC/DC conversion in order to store the power stored in the capacitor 112 in the battery 114.

Herein, since the same current flows in the PCSs connected to one phase, the voltage charged in the capacitor 112 is determined by controlling the input AC voltage of the PCS, and the charging voltage of the battery 114 is determined by controlling the DC/DC converter 113.

At this time, the control of the AC/DC converter 111 is determined according to the each-phase battery SoC and the individual battery SoC, and the control of the DC/DC converter 113 is determined according to the individual battery SoC. Hereinafter, the operations will be described in detail with reference to FIGS. 4 to 7.

Figure 4:
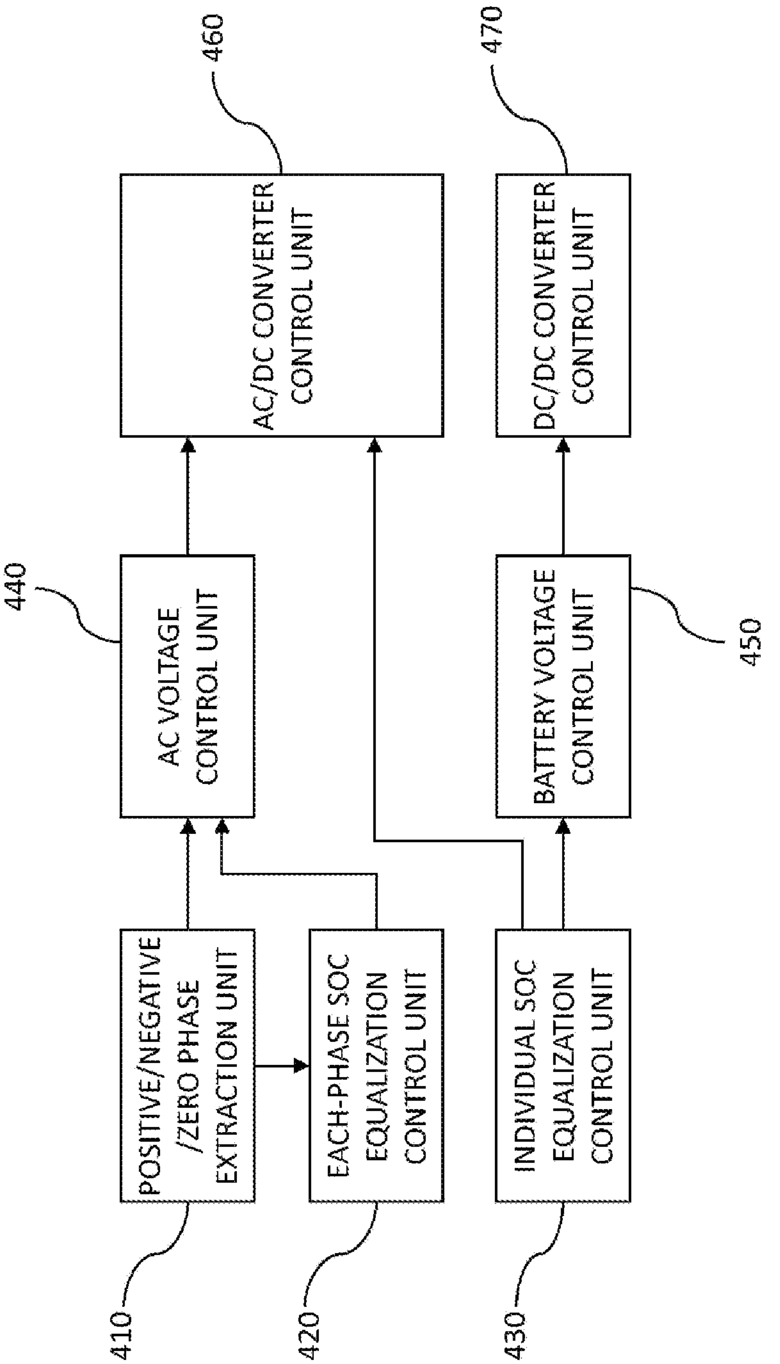
FIG. 4 is a diagram illustrating the SoC equalization control device of FIG. 1 in detail.

FIG. 4 is a diagram illustrating the SoC equalization control device 400 of FIG. 1 in detail.

As illustrated in FIG. 4, the SoC equalization control device 400 includes a positive/negative/zero phase component extraction unit 410 that extracts the powers of the positive, negative, and zero components of the delta connection, an each phase SoC equalization control unit 420 calculating a total zero phase component AC voltage command value based on an output of the positive/negative/zero phase component extraction unit 410 for the equalization control of the each-phase battery SoC of the phase PCS 100, the B-phase PCS 200, and the C-phase PCS 300, an individual SoC equalization control unit 430 calculating the individual capacitor voltage command value for the equalization control of individual battery SoC of the A-phase PCS 100, the B-phase PCS 200, and the C-phase PCS 300, an AC voltage control unit 440 calculating the each-phase AC voltage command value based on outputs of the positive/negative phase/zero phase component extraction unit 410 and the each-phase SoC equalization control unit 420, a battery voltage control unit 450 calculating the individual battery voltage command value based on an output of the individual SoC equalization control unit 430, an AC/DC converter control unit 460 that controls the AC/DC converter 111 of the PCS based on outputs of the individual SoC equalization control unit 430 and the AC voltage control unit 440, and a DC/DC converter control unit 470 that controls the DC/DC converter 113 of the PCS based on an output of the battery voltage control unit 450.

In this case, the positive/negative/zero phase component extraction unit 410 can extract the powers of the positive, negative, and zero phase components based on the each-phase AC voltage and the each-phase AC current.

The each-phase SoC equalization control unit 420 calculates the total zero phase component AC voltage command value, which will be described later with reference to FIG. 5.

In addition, the individual SoC equalization control unit 430 calculates the individual battery charging/discharging voltage command value based on the difference of the individual SoCs compared to the each-phase average SoC, and calculates the individual capacitor voltage command value based on the individual battery charging/discharging voltage command value and the total capacitor voltage command value which is the average of the individual capacitor voltage command value.

Herein, the battery voltage control unit 450 can calculate the individual battery voltage command value for controlling the DC/DC converter of the PCS based on a difference between the individual capacitor voltage and the individual capacitor voltage command value and the individual battery voltage.

In addition, the AC/DC converter control unit 460 can control the AC/DC converter 111 of the PCS based on a ratio of the individual capacitor voltage command value and the total capacitor voltage command value that is an average of the individual capacitor voltage command value and the each-phase voltage command value.

That is, in the present invention, the control of the AC/DC converter 111 can be performed by changing the current for each phase without changing the active power and the reactive power by controlling the zero phase component extracted from the positive/negative/zero phase component extraction unit 410, and the AC/DC converters 111 connected to each phase can be individually controlled.

Figure 5:
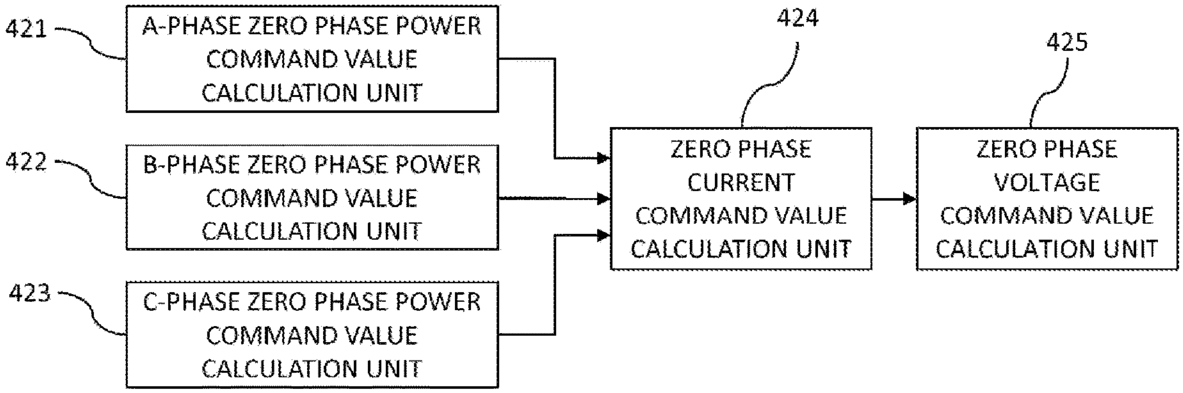
FIG. 5 is a diagram illustrating the SoC equalization control device for each phase of FIG. 4 in detail.

FIG. 5 is a detailed diagram of the each-phase SoC equalization control unit 420 of FIG. 4.

As illustrated in FIG. 5, the each-phase SoC equalization control unit 420 can include an A-phase zero phase component power command value calculation unit 421 calculating the zero phase component power command value of the A-phase PCS 100 based on the difference between the average battery SoC of the A-phase PCS 100 compared to the total battery SoC and the average battery voltage of the A-phase PCS 100, a B-phase zero phase component power command value calculation unit 422 calculating the zero phase component power command value of the B-phase PCS 200 based on the difference between the average battery SoC of the B-phase PCS 200 compared to the total battery SoC and the average battery voltage of the B-phase PCS 200, a C-phase zero phase component power command value calculation unit 423 calculating the zero phase component power command value of the C-phase PCS 300 based on the difference between the average battery SoC of the C-phase PCS 200 compared to the total battery SoC and the average battery voltage of the C-phase PCS 300, a zero phase component current command value calculation unit 424 calculating a total zero phase component current command value based on outputs of the A-phase zero phase component power command value calculation unit 421, the B-phase zero phase component power command value calculation unit 422, and the C-phase zero phase component power command value calculation unit 423, and a zero phase component voltage command value calculation unit 425 calculating a total zero phase component voltage command value based on a difference between an output of the zero phase component current command value calculation unit 424 and a current total zero phase component current.

The each-phase SoC equalization control unit 420 according to the present invention can calculate the zero phase component voltage command value by calculating the current command value capable of controlling only the zero phase component current without changing the active power and the reactive power in the delta connection.

Figure 6:
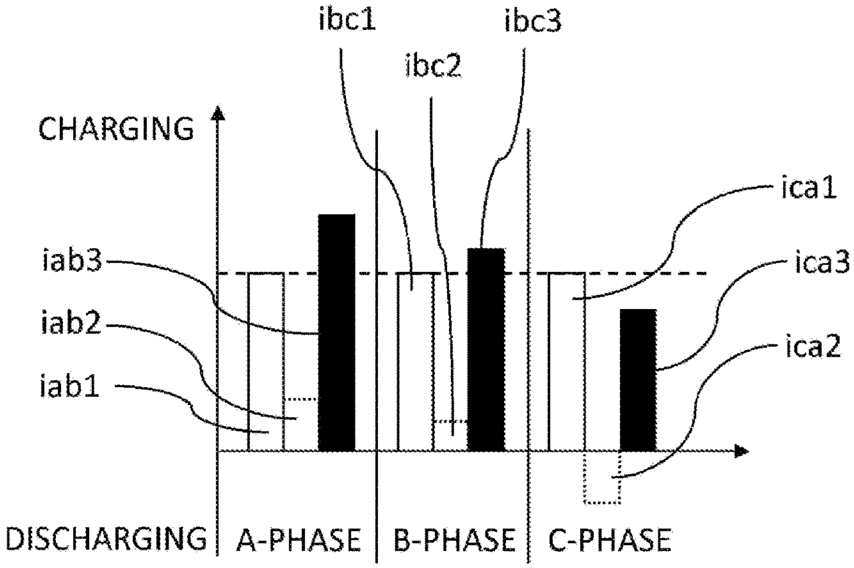
FIG. 6 is the graph analyzing current flowing through the A-phase PCS, the B-phase PCS, and the C-phase PCS of FIG. 1.

FIG. 6 is the graph analyzing the current flowing through the A-phase PCS 100, the B-phase PCS 200, and the C-phase PCS 300 of FIG. 1.

As illustrated in FIG. 6, in the present invention, the A-phase positive phase component current iab1, the B-phase positive phase component current ibc1, and the C-phase positive phase component current ica1 are the same, but the A-phase, B-phase, and A-phase battery SoCs are different, and thus, the A-phase zero phase component current iab2, the B-phase zero phase component current ibc2, and the C-phase zero phase component current ica2 are generated as zero phase component currents for controlling the difference of the each-phase battery SoC.

In addition, the AC/DC converter 111 is controlled based on this configuration so that a A-phase integrated current iab3 obtained by integrating the A-phase positive phase component iab1 and the A-phase zero phase component current iab2, a B-phase integrated current ibc3 obtained by integrating the B-phase positive phase component ibc1 and the B-phase zero phase component current ibc2, and a C-phase integrated current ica3 obtained by integrating the C-phase positive phase component ica1 and the C-phase zero phase component current ica2, can flow.

Figure 7:
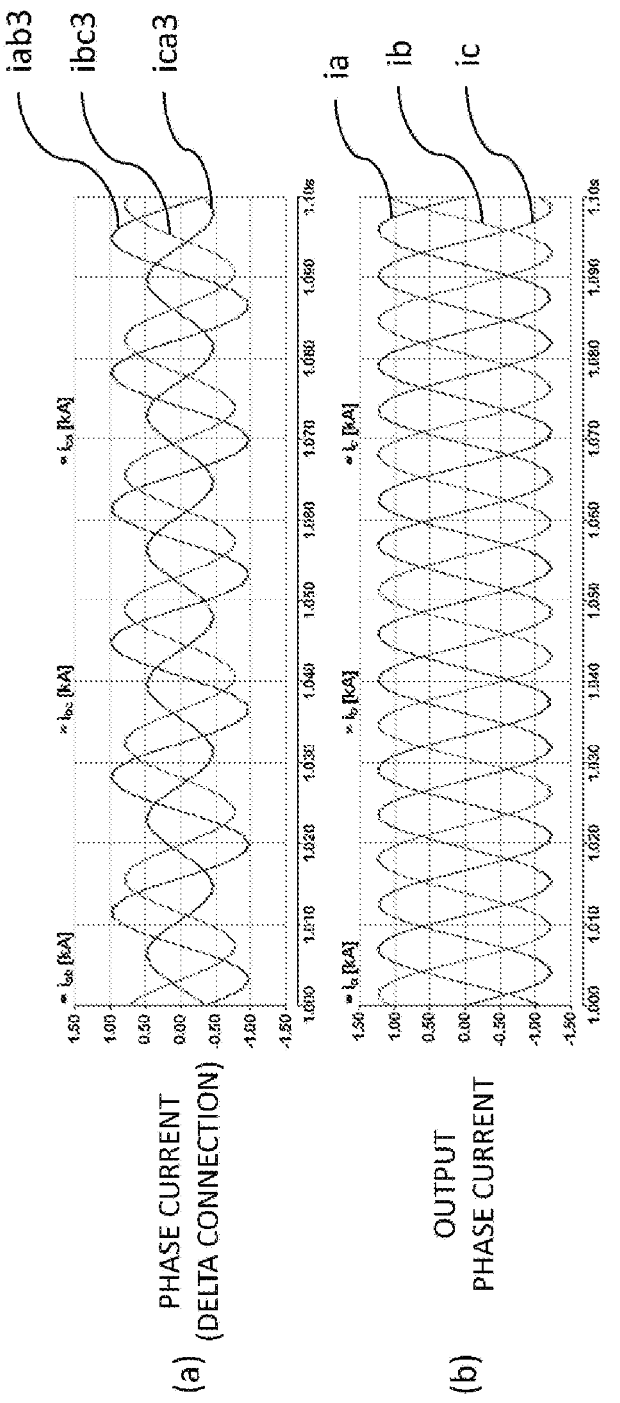
FIG. 7 illustrates in detail current flowing in the A-phase PCS, the B-phase PCS, the C-phase PCS, and the 3-phase AC power supply of FIG. 1 in detail.

FIG. 7 illustrates in detail the current flowing through the A-phase PCS 100, the B-phase PCS 200, the C-phase PCS 300 and the 3-phase AC power supply 500 of FIG. 1. FIG. 7A is a waveform diagram illustrating the phase current of the delta connection, and FIG. 7B is a waveform diagram illustrating the supply current of the 3-phase AC power supply 500 that is the input of the delta connection.

As illustrated from FIG. 7, in the present invention, the A-phase integrated current iab3, the B-phase integrated current ibc3, and the C-phase integrated current ica3 are controlled differently depending on the each-phase battery SoC, while only the zero phase component is controlled without changing the active power or the reactive power. There is an advantage that the active powers of an a-distribution current ia, a b-distribution current ib, and a c-distribution current 1*c* do not change.

Figure 8:
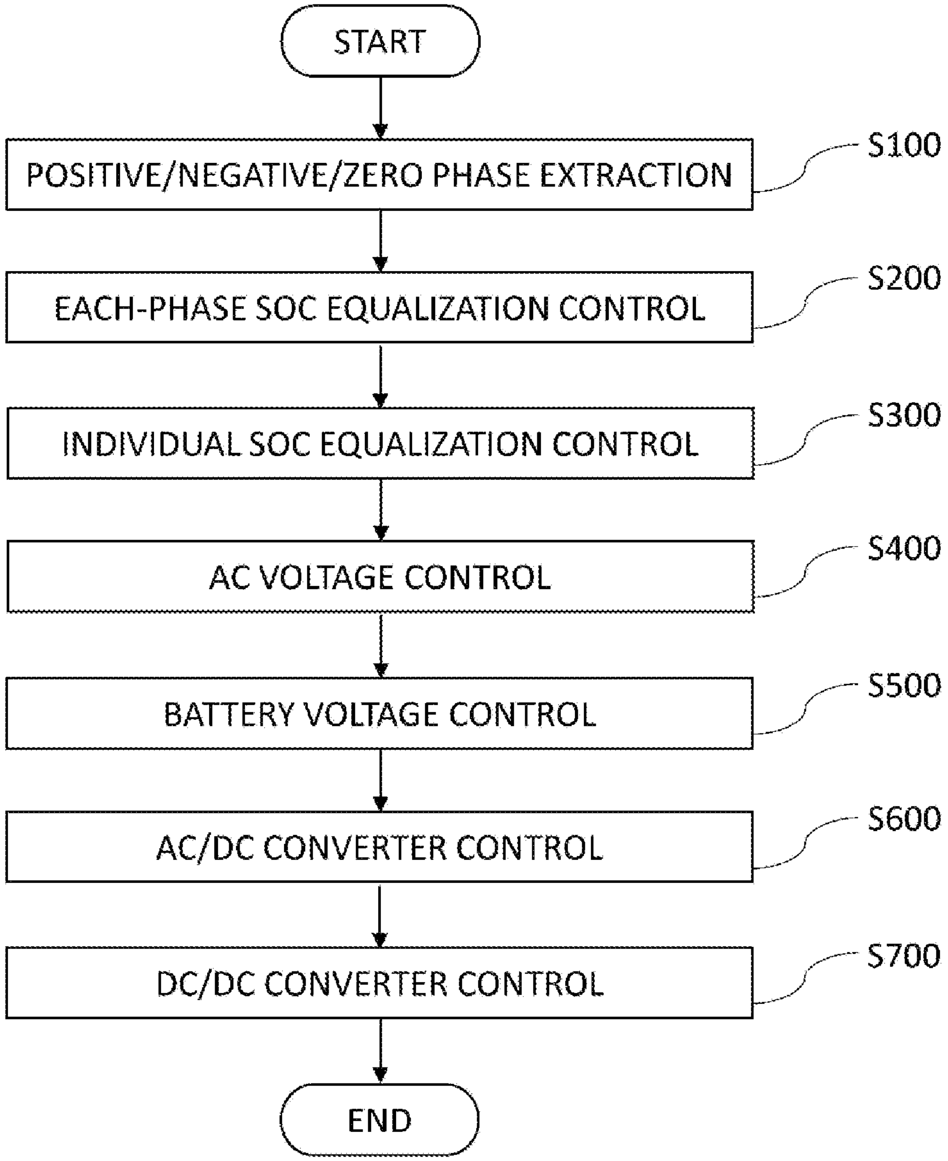
FIG. 8 is a flowchart illustrating the SoC equalization controlling method of the energy storage device based on the delta structure semiconductor transformer according to the embodiment of the present invention.

FIG. 8 is a flowchart illustrating the SoC equalization controlling method of the energy storage device based on the delta structure semiconductor transformer according to the embodiment of the present invention.

As illustrated in FIG. 8, the SoC equalization controlling method of the energy storage device based on the delta structure semiconductor transformer according to the present invention includes a positive/negative/zero phase component extracting process (S100), and an each phase SoC equalization controlling process (S200), an individual SoC equalization controlling process (S300), an AC voltage controlling process (S400), a battery voltage controlling process (S500), an AC/DC converter controlling process (S600), and a DC/DC converter controlling process (S700).

In the positive/negative/zero phase component extracting process (S100), the PCS performing the charging/discharging of the 3-phase AC power supply 500 extracts the powers of the positive, negative, and zero phase components of the delta-connected A-phase PCS 100, B-phase PCS 200, and C-phase PCS 300.

In the each-phase SoC equalization controlling process (S200), for the equalization control of the each-phase battery SoC of the A-phase PCS 100, the B-phase PCS 200, and the C-phase PCS 300, a total zero phase component AC voltage command value is calculated based on the powers of positive, negative, and zero phase components.

In the individual SoC equalization controlling process (S300), individual capacitor voltage command value for the equalization control of the individual battery SoC of the A-phase PCS 100, the B-phase PCS 200, and the C-phase PCS 300 are calculated.

Thereafter, in the AC voltage controlling process (S400), the each-phase AC voltage command value is calculated based on powers of the positive, negative, and zero phase components and the total zero phase component AC voltage command value.

In the battery voltage controlling process (S500), the individual battery voltage command value is calculated based on an output of the individual capacitor voltage command value.

In the AC/DC converter controlling process (S600), the AC/DC converter 111 of the PCS is controlled based on the individual capacitor voltage command value and the each-phase AC voltage command value.

In the DC/DC converter controlling process (S700), the DC/DC converter 113 of the PCS is controlled based on individual battery voltage command values.

Hereinafter, the above processes will be described in more detail, and first, in the positive/negative/zero phase component extracting process (S100), the positive, negative, and zero phase component powers are extracted based on the each-phase AC voltage and each-phase AC current.

In addition, the each-phase SoC equalization controlling process (S200) includes processes of: calculating a zero phase component power command value of the A-phase PCS 100 based on a difference between average battery SoCs of the A-phase PCS 100 compared to a total battery SoC and the average battery voltage of the A-phase PCS by an A-phase zero phase component power command value calculation unit 421; calculating a zero phase component power command value of the B-phase PCS 200 based on a difference between average battery SoCs of the B-phase PCS 200 compared to a total battery SoC and the average battery voltage of the B-phase PCS 200 by a B-phase zero phase component power command value calculation unit 422; calculating a zero phase component power command value of the C-phase PCS 300 based on a difference between average battery SoCs of the C-phase PCS 300 compared to a total battery SoC and the average battery voltage of the C-phase PCS 300 by a C-phase zero phase component power command value calculation unit 423; calculating a total zero phase component current command value based on outputs of the A-phase zero phase component power command value calculation unit 421, the B-phase zero phase component power command value calculation unit 422, and the C-phase zero phase component power command value calculation unit 423 by a zero phase component current command value calculation unit 424; and calculating a total zero phase component voltage command value based on a difference between an output of the zero phase component current command value calculation unit 424 and a current total zero phase component current by a zero phase component voltage command value calculation unit 425.

Herein, in the individual SoC equalization controlling process (S300), the individual battery charging/discharging voltage command value is calculated based on the difference between the individual SoC compared to an each-phase average SoC, and the individual capacitor voltage command value is calculated based on an individual charging/discharging voltage command value and a total capacitor voltage command value that is an average of the individual capacitor voltage command value.

In addition, in the battery voltage controlling process (S500), the individual battery voltage command value for controlling the DC/DC converter of the PCS is calculated based on a difference between the individual capacitor voltage and the individual capacitor voltage command value and the individual battery voltage.

In the AC/DC converter controlling process (S600), the AC/DC converter 111 of the PCS is controlled based on a ratio of the individual capacitor voltage command value and the total capacitor voltage command value that is an average of the individual capacitor voltage command value and the each-phase voltage command value.

That is, in the present invention, the control of the AC/DC converter 111 is performed by changing the current for each phase without changing the active power and the reactive power with control of the zero phase component extracted from the positive/negative/zero phase component extraction unit 410, and the AC/DC converter 111 connected to each phase can be individually controlled.

Accordingly, in the present invention, by controlling equalization of the individual battery SoC in the PCS, overdischarging and overcharging that can be caused by un-equalized battery SoC can be prevented, and the charging time and the discharging time of the system can be effectively managed. In addition, the phenomenon in which the charging time and the discharging time are limited by the specific battery due to un-equalized battery SoC can be prevented.

As described above, the SoC equalization control device and method of the energy storage device based on the delta structure semiconductor transformer according to the present invention has an advantage of preventing overdischarging and overcharging of a specific battery by performing equalization control for SoCs of batteries of PCSs connected in a delta connection and has an advantage in that a charging time and a discharging time of a system can be effectively operated by performing equalization control of each-phase battery SoCs with control of zero phase components of a delta connection and equalizing individual battery SoCs.

The foregoing description includes examples of one or more embodiments. While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

INDUSTRIAL APPLICABILITY

The present invention relates to the device and method for controlling the state of charging (SoC) of the energy storage device and is applicable to the energy storage device.

The invention claimed is:

1. A state of charge (SOC) equalization control system of an energy storage device based on a delta structure semiconductor transformer, the SoC equalization control system comprising:

an A-phase power conditioning system (PCS), a B-phase PCS, and a C-phase PCS, wherein the A-phase, B-phase, and C-phase PCSs are arranged in a delta connection to perform charging or discharging a battery using a 3-phase alternating current (AC) power supply; and an SoC equalization control device configured to control the charging or discharging of the battery such that battery SoCs of the A-phase, B-phase, and C-phase PCSs are equalized, wherein each of the A-phase, B-phase, and C-phase PCSs includes:

an AC/direct current (DC) converter configured to convert an alternating current (AC) into a DC and store power in a capacitor; and a DC/DC converter configured to perform DC/DC conversion in order to store the power stored in the capacitor in the battery, wherein the SoC equalization control device includes:

a positive/negative/zero-phase component extraction unit configured to extract powers of positive, negative, and zero components in the delta connection;

an each-phase SoC equalization control unit configured to calculate a total zero-phase component AC voltage command value based on an output of the positive/negative/zero-phase component extraction unit for equalizing an each-phase battery SoC of the A-phase, B-phase, and C-phase PCSs;

an individual SoC equalization control unit configured to calculate an individual capacitor voltage command value for equalizing an individual battery SoC of the A-phase, B-phase, and C-phase PCSs;

an AC voltage control unit configured to calculate an each-phase AC voltage command value based on the output of the positive/negative phase/zero phase component extraction unit and an output of the each-phase SoC equalization control unit;

a battery voltage control unit configured to calculate an individual battery voltage command value based on an output of the individual SoC equalization control unit;

an AC/DC converter control unit configured to control the AC/DC converter based on the output of the individual SoC equalization control unit and an output of the AC voltage control unit; and a DC/DC converter control unit configured to control the DC/DC converter based on an output of the battery voltage control unit.

2. The SoC equalization control system according to claim 1, wherein at least two or more PCSs of the A-phase PCS, the B-phase PCS, and the C-phase PCS are connected in series therein.

3. The SoC equalization control system according to claim 1, wherein the positive/negative/zero phase component extraction unit is configured to extract the powers of positive, negative, and zero phase components based on an each-phase AC voltage and an each-phase AC current.

4. The SoC equalization control system according to claim 1, wherein the each-phase SoC equalization control unit includes:

an A-phase zero phase component power command value calculation unit configured to calculate a zero-phase component power command value of the A-phase PCS based on a difference between an average battery SoC of the A-phase PCS and a total battery SoC of the A-phase, B-phase, and C-phase PCSs, and based on an average battery voltage of the A-phase PCS;

a B-phase zero phase component power command value calculation unit calculating configured to calculate a zero-phase component power command value of the B-phase PCS based on a difference between an average battery SoC of the B-phase PCS and the total battery SoC, and based on an average battery voltage of the B-phase PCS;

a C-phase zero phase component power command value calculation unit configured to calculate a zero-phase component power command value of the C-phase PCS based on a difference between an average battery SoC of the C-phase PCS and the total battery SoC, and based on an average battery voltage of the C-phase PCS;

a zero-phase component current command value calculation unit configured to calculate a total zero phase component current command value based on outputs of the A-phase zero phase component power command value calculation unit, the B-phase zero phase component power command value calculation unit, and the C-phase zero phase component power command value calculation unit; and a zero-phase component voltage command value calculation unit configured to calculate a total zero phase component voltage command value based on a difference between an output of the zero-phase component current command value calculation unit and a current total zero phase component current.

5. The SoC equalization control system according to claim 1, wherein the individual SoC equalization control unit is configured to:

calculate an individual battery charging/discharging voltage command value based on a difference of an individual SoC compared to an each-phase average SoC; and calculate the individual capacitor voltage command value based on the individual battery charging/discharging voltage command value and a total capacitor voltage command value defined as an average of the individual capacitor voltage command value.

6. The SoC equalization control system according to claim 1, wherein the battery voltage control unit is configured to calculate the individual battery voltage command value for controlling the DC/DC converter based on a difference between an individual capacitor voltage and the individual capacitor voltage command value, and based on an individual battery voltage.

7. The SoC equalization control system according to claim 1, wherein the AC/DC converter control unit is configured to control the AC/DC converter based on a ratio of the individual capacitor voltage command value and a total capacitor voltage command value defined as an average of the individual capacitor voltage command value, and based on an each-phase voltage command value.

* * * * *